United States Patent [19]

Hsu et al.

[11] Patent Number: 6,120,717
[45] Date of Patent: Sep. 19, 2000

[54] PREPRESS SEALER FOR USE IN HARDBOARD MANUFACTURE

[75] Inventors: Oscar Hsien-Hsiang Hsu; Gabriel Louis De Tommaso, both of Lansdale, Pa.

[73] Assignee: Rohm and Haas Company, Philadelphia, Pa.

[21] Appl. No.: 08/432,649

[22] Filed: May 2, 1995

Related U.S. Application Data

[63] Continuation of application No. 07/814,181, Dec. 18, 1991, abandoned, which is a continuation of application No. 07/471,897, Jan. 25, 1990, abandoned.

[51] Int. Cl.[7] ........................................ D04H 1/64
[52] U.S. Cl. ........................... 264/128; 156/62.2; 524/5.2
[58] Field of Search ........................... 264/128; 156/62.2; 524/512

[56] References Cited

U.S. PATENT DOCUMENTS

| | | |
|---|---|---|
| 4,062,823 | 12/1977 | Cheung et al. . |
| 4,075,141 | 2/1978 | Porter et al. . |
| 4,201,802 | 5/1980 | Vande Kieft . |
| 4,238,438 | 12/1980 | Laughinghouse et al. . |
| 4,336,174 | 6/1982 | Sanfilippo et al. ............. 524/512 |
| 4,374,899 | 2/1983 | Sanfilippo et al. . |
| 4,517,228 | 5/1985 | Matejka et al. . |
| 4,517,240 | 5/1985 | Tracton et al. . |
| 4,920,175 | 4/1990 | Kanda et al. ............. 524/512 |

FOREIGN PATENT DOCUMENTS 1484053  8/1977  United Kingdom .

*Primary Examiner*—John J. Gallagher
*Attorney, Agent, or Firm*—Ronald D. Bakule

[57] ABSTRACT

A prepress sealer for use in the process of making wood composition board is provided. The prepress sealer incorporates a crosslinking resin and an aqueous dispersion of acrylic polymer particles. The acrylic polymer particles have a THF gel content of greater than about 70%. Use of the prepress sealer provides improved press release during board manufacture and improved surface toughness and water resistance to the produced board.

2 Claims, No Drawings

6,120,717

PREPRESS SEALER FOR USE IN HARDBOARD MANUFACTURE

This is a continuation of application Ser. No. 07/814,181, filed Dec. 18, 1991, now abandoned, which is a continuation of application Ser. No. 07/471,897, filed Jan. 25, 1990, now abandoned.

FIELD OF THE INVENTION

This invention relates to an improved method for preparing wood composition board, such as hardboard, fabricated consolidating fibers or chips under heat and pressure to form an integral board material. The method incorporates applying an aqueous polymeric composition, also known as a prepress sealer, to the surface of a fibrous mat prior to subjecting the mat to a high temperature and pressure press treatment.

BACKGROUND OF THE INVENTION

Wood composition board such as, for example, hardboard is manufactured by the reconsolidation of defiberated wood chips under heat (up to about 450 F.) and pressure (up to about 1000 p.s.i.). The fibrous particles are first formed into a unitary mat (either by a dry process, wet process, or wet-dry process) which is then consolidated into a solid board by applying heat and pressure. Prior to the consolidation, compositions containing aqueous polymeric dispersions, aminoplast resins, phenol-formaldehyde resins, waxes and the like may be applied to the mat to increase strength, improve surface integrity, and enhance water resistance. These compositions are referred to as "prepress sealers". However, the production of wood composition boards still suffers technical problems such as press plate sticking, loss of press plate definition, lack of board surface toughness and uniformity, excessive water absorptivity, and discoloration. Further, repetitive consolidation cycles may cause deposits of prepress sealer and fibers on the press plates. These deposits may require frequent plate cleaning and lead to lower production rates as a result of increased downtime.

DESCRIPTION OF THE PRIOR ART

Great Britain Patent 1,484,053 discloses impregnating a paper carrier web with an aqueous solution of an aminoplast resin, and drying the impregnated web in such a way that it contains 40 to 60% by weight of aminoplast resin precondensate, relative to the weight of the paper; and coating the dried impregnated web with an aqueous dispersion comprising a curable resin composition which is a mixture of A) a hard and brittle copolymer which has been obtained by copolymerization of certain monomers, and B) a rubbery-elastic copolymer which has a glass transition temperature not higher than +10 C., and has been obtained by the copolymerization of certain monomers, including 0 to 2% by weight of a crosslinking monomer with at least two reactive non-conjugated double bonds in the molecule. Further disclosed is coating the impregnated paper web and pressing the resulting film onto a pressboard sheet. This reference does not disclose the application of a polymer dispersion/aminoplast mixture to a fibrous mat prior to compaction.

U.S. Pat. No. 4,201,802 discloses a process for manufacturing prefinished hardboard which includes the use of an aqueous pre-press sealer containing a polyvinyl alcohol polymer together with emulsified fatty acids or esters, a volatile amine, and aluminum, zinc, or calcium stearates as well as driers or catalysts if desired. The polyvinyl alcohol is disclosed to be preferably "a homopolymer of vinyl alcohol monomer copolymerized to provide a polymer although a copolymer can be used containing very minor amounts up to about 5% of other ethylenically unsaturated monomers containing carbon-to-carbon double bond unsaturation." In a further disclosure the polyvinyl alcohol is described as partially hydrolyzed, preferably 85 to 90% hydrolyzed. This reference does not teach or suggest the importance of the gel content of the dispersed polymer.

U.S. Pat. No. 4,238,438 discloses a pre-press hardboard treatment comprising applying to the surface fibers of a fibrous mat from 8 to 30 grams per square foot of a coating of a surface consolidating agent comprising from 50 to 95% water, from 4 to 25% of a hydroxy-radical-containing compound having a boiling point between about 212 F. and 600 F. which is selected from the group of alcohols and their esters, and from 1 to 25% polyvinyl acetate, wherein the percentage of coating ingredients are based on the weight of the coating. The polyvinyl acetate latex emulsions disclosed are commercial materials. The reference is silent with regard to specific compositions or gel content of the polyvinyl acetate latex.

U.S. Pat. No. 4,336,174 and U.S. Pat. No. 4,374,899 disclose a pre-press hardboard treating composition and an improved hardboard sheet produced by the coating of the wet felt mats or laps or sheets, before consolidation and drying, with an aqueous sealer composition that consists essentially of (a) blend of water-soluble melamine-formaldehyde copolymer, (b) a styrene-acrylic copolymer emulsion, (c) a small amount of an amine capable of adjusting the pH of the resulting emulsion, and (d) a crosslinking acid catalyst capable of cross-linking the composition. Disclosed are the use of commercial vinyl acetate and styrene/acrylic copolymer emulsions. The reference is silent regarding the compositions of the copolymer emulsions used or their gel content.

U.S. Pat. No. 4,517,228 discloses a conventional process for preparing composition board products which employs a unique step of applying to a composition mat of a density of less than 60 lbs. per cubic foot prior to the application of heat and pressure, a coating composition comprising an hydroxyl or carboxylic acid-containing acrylic vehicle, a high melting wax, a melamine-based crosslinker for the vehicle, and a platelet form of talc. The hydroxyl or carboxylic acid acrylic vehicle is not disclosed to contain any gel content.

U.S. Pat. No. 4,517,240 discloses a one-step process for simultaneously compressing and tempering a fiberboard panel, which includes the step of applying to the panel prior to compression thereof an effective amount of an aqueous treating composition which contains about 3–20% by weight of an acrylic or vinyl acetate emulsion polymer or solution polymer and about 0.05 to 3.0% by weight of a fluid, water-soluble organosilicone copolymer of dimethylpolysiloxane and a polyoxyalkylene ether wherein the alkylene moiety is ethylene or propylene or mixtures thereof, characterized in that the treating composition acts both as a platen release agent during the compression and as a tempering agent for imparting water resistance. Acrylic polymers included alkyl methacrylate/alkyl acrylate/acrylic or methacrylic acid and styrene/alkyl acrylate/N-alkylol acrylamide/acrylic or methacrylic acid copolymers, for example. The polymers were not disclosed to include any gel content.

U.S. Pat. No. 4,075,141 discloses coating compositions which contain crosslinked polymeric microparticles and a carboxylic acid amide interpolymer which may be combined with an aminoplast resin crosslinking agent. The compositions are disclosed to be useful for application to substrates such as paper, metal, wood, paperboard, plastic, foam, extruded rubber, and the like. Neither specific gel content nor use on wood composition board are disclosed.

U.S. Pat. No. 4,062,823 discloses compositions incorporating a mixture of at least two copolymers of acrylic monomers, a crosslinked latex, an amine, an amino resin crosslinking agent, and water or water and an organic solvent. The use of these compositions as water-based paints is disclosed. Neither specific gel content of the crosslinked latex nor use on wood composition board are disclosed.

None of the references teach the use of a prepress sealer composition which contains an aminoplast resin and an aqueous dispersion of acrylic particles with a gel content greater than about 70% for application to a fibrous mat prior to the consolidation of a wood composition board.

It is, therefore, an object of this invention to provide a prepress sealer composition which provides improved press release during the process of manufacturing wood composition boards.

It is a further object of this invention to provide an improved hardboard with superior water resistance and surface toughness by the use of a prepress sealer composition.

SUMMARY OF THE INVENTION

A prepress sealer composition is provided. When the prepress sealer is used in the process of making wood composition board, the process is improved as a result of more facile release of the formed composition board from the press plates. When the prepress sealer is used, the water resistance and surface toughness properties of the formed board are also improved.

DETAILED DESCRIPTION OF THE INVENTION

This invention is directed to an improvement in the process for manufacturing wood composition boards wherein an aqueous composition, defined herein as a "prepress sealer", is applied to a fibrous mat composed of wood fibers or chips prior to the consolidation of the mat to an integral sheet under heat and pressure. The prepress sealer incorporates a crosslinking resin such as, for example, an aminoplast resin and an aqueous dispersion of acrylic polymer particles wherein the acrylic polymer particles have a THF(tetrahydro-furan) gel content of greater than about 70%.

As used herein, "wood composition board" includes the various hardboards, fiber boards, particle boards, wafer boards, and strand boards, such as, for example, wet processed hardboards, dry processed hardboard, wet/dry processed hard boards, medium density fiber board, oriented strand board, and mende boards.

The prepress sealer incorporates a crosslinking resin, that is, a species adapted to react with functionality incorporated in or associated with the acrylic polymer particles under the conditions attained during the manufacture of the wood composition board. One class of crosslinking resins suitable for use in this invention are aminoplast resins such as, for example a melamine-formaldehyde crosslinking agent, a urea- formaldehyde crosslinking agent, or mixtures thereof. Other crosslinking resins which may be used in the practice are multi-functional resins such as, for example, multi-functional hydroxyalkyl amides and multi-functional N-alkylol amides.

The prepress sealer incorporates an aqueous dispersion of acrylic polymer particles wherein the acrylic polymer particles have a THF gel content of greater than about 70%. The aqueous dispersion of acrylic polymer particles may be prepared by any aqueous polymerization technique known in the art such as, for example, suspension polymerization and emulsion polymerization. Emulsion polymerization is preferred. The acrylic polymer particles have an acrylic content of at least about 20% by weight of the total weight of the polymer. Preferred is an acrylic content of at least about 40% by weight of the total weight of the polymer. The acrylic polymer-particles are prepared by the polymerization of ethylenically unsaturated monomers. The acrylic content results from the polymerization of acrylate or methacrylate esters, amides, acids, and the like, such as, for example, methyl acrylate, ethyl acrylate, butyl acrylate, 2-ethylhexyl acrylate, decyl acrylate, methyl methacrylate, ethyl methacrylate, butyl methacrylate, i-butyl methacrylate, i-bornyl methacrylate, acrylamide, acrylonitrile, hydroxyethyl methacrylate, hydroxypropyl methacrylate, methylol (meth)acrylamide, methylolated ureidoethyl methacrylate, N,N-dimethylaminoethyl methacrylate, acrylic acid, methacrylic acid, and acryloxypropionic acid. The non-acrylic portion of the acrylic polymer particles results from the polymerization of styrenics and other ethylenically unsaturated monomer such as, for example, styrene, substituted styrenes, butadiene, vinyl acetate, vinyl versatate, crotonic acid esters, maleic acid, fumaric acid, and itaconic acid.

The gel content of the acrylic polymer particles may relate to crosslinking of the polymer molecules within the particles. Such crosslinking may occur during or subsequent to the preparation of the particles, or by a combination thereof. Crosslinking may be effected by the incorporation of multi-ethylenically unsaturated monomers into the polymerization. The multi-ethylenically unsaturated monomers may be acrylic such as, for example, 1,4-butyleneglycol dimethacrylate, trimethylolpropane triacrylate, and allyl methacrylate or non-acrylic such as, for example, diallyl phthalate and divinyl benzene. Gel content is preferably effected by the incorporation of allyl methacrylate into the acrylic polymer particles at a level of about 0.2% to about 5% by weight based on the weight of the polymer particles. More preferred is the incorporation of allyl methacrylate into the acrylic polymer particles at a level of about 0.3% to about 2.0% by weight based on the weight of the polymer particles.

The glass transition temperature (Tg) of the acrylic polymer particles may be in the range of about 15 C. to about 100 C., as determined by differential scanning calorimetry. Preferred is a Tg of about 20 C. to about 50 C. The acrylic polymer particles may include blends of polymers; incorporating polymer(s) with a Tg greater than about 50 C. in blends is useful in increasing the surface hardness of the resulting board.

It is required that the acrylic polymer particles have a THF gel content greater than about 70%. The THF gel content as defined herein was determined by preparing a 2% mixture of polymer particle solids in 1 ounce of tetrahydrofuran. The exact solids of the mixture was determined by drying the solution at 150 C. for a period of 30 minutes. The 2% mixture was shaken overnight and transferred to a tared centrifuge tube. The tube was spun down on an ultracentrifuge at 50,000 rpm for 2.5 hrs. The supernatant solution was decanted off, most of the THF was allowed to evaporate at room temperature, and then dried down at 150 C. for 30 minutes. Duplicate runs were carried out. The THF gel fraction was the proportion of polymer which was not dissolved in the supernatant solution.

The prepress sealer of this invention may also be compounded with waxes, pigments, fillers, reinforcing agents, flow control agents, release agents such as, for example, calcium stearate, antifoaming agents, and the like. The prepress sealer may be applied to the surface of the mat by conventional techniques such as, for example, spraying.

The following examples are intended to illustrate the improvement in the process for manufacturing wood composition boards to which this invention is directed. They are not intended to limit the invention as other applications of the invention will be obvious to those of ordinary skill in the art.

EXAMPLE 1. Preparation of aqueous copolymer dispersion

Preparation of Sample 1. To a one gallon stirred reactor containing 1006.26 grams(g.) of deionized water (DI water), 4.0 g. of anionic surfactant (58% active), and 27.4 g. of itaconic acid which had been heated to 85.2 C. was added 128.3 g. of a preform emulsion and a solution of 4.6 g. ammonium persulfate in 29.8 g. DI water. The temperature dropped to 80.5 C. and then an exotherm to 83.2 C was observed, along with a blue color and heavy refluxing. Fifteen minutes after the addition of the preform the temperature was at 81 C. and the addition of the monomer emulsion (ME#1) and a solution of 2.7 g. ammonium persulfate in 98.7 g. DI water were begun. The addition of ME#1 was completed in 142 minutes and a rinse of 22.3 g. DI water was added. The addition of the ammonium persulfate solution was completed 38 minutes later with the temperature at 81 C. and cooling was initiated. Nine minutes later, with the temperature at 74.2 C., 37.2 g. of DI water was added and cooling was continued. Six minutes later, with the temperature at 60 C., three solutions were added: 0.9 g. t-butyl hydroperoxide and 0.15 g. anionic surfactant (58% active) in 9.3 g. DI water; 0.5 g. sodium sulfoxylate formaldehyde in 14.0 g. DI water; and 4.65 9. of a 0.15% aqueous solution of ferrous sulfate heptahydrate. Fifteen minutes later with the temperature at 55 C., solutions identical to the first two of the three abovementioned solutions were added. Twenty-two minutes later, with the temperature at 50 C., 53.9 g. DI water, 36.7 g. dimethylaminoethanol, and 15.35 g. of anionic surfactant were added. The final product had a solids content of 46.8%, a pH=8.75, a viscosity of 435 centipoises, a particle size of 121 nanometers, and a THF gel content of 67.

TABLE 1.1

| Monomer Emulsion ME #1 | |
|---|---|
| Butyl acrylate | 780.3 g. |
| Methyl methacrylate | 477.1 g. |
| Styrene | 459.4 g. |
| Hydroxyethyl Methacrylate | 92.1 g. |
| Allyl methacrylate | 4.6 g. |
| Anionic surfactant(58% active) (ALIPAL CO436) | 27.5 g. |
| DI water | 688.2 g. |

EXAMPLE 2. Preparation of aqueous copolymer dispersions

Preparation of Samples 2–4 and Comparative Sample A. The samples were prepared according to the method of Example 1 with the exception that a different monomer emulsion (ME#1) was used in each case as indicated in Table 2.1 and that the polymerization of Sample 2 was carried out in a 5 gallon reactor with a five-fold increase in the quantities of all ingredients. The resulting dispersions exhibited the properties tabulated in Table 2.2.

TABLE 2.1

| Monomer Emulsions ME #1 (All quantities are in grams) | | | | |
|---|---|---|---|---|
| Sample | 2 | 3 | 4 | Comparative A |
| Butyl acrylate | 3901.4 | 780.3 | 780.3 | 780.3 |
| Methyl methacrylate | 2385.5 | 477.1 | 477.1 | 477.1 |
| Styrene | 2297.1 | 459.4 | 459.4 | 459.4 |
| Hydroxyethyl methacrylate | 460.4 | 92.1 | 92.1 | 92.1 |
| Allyl Methacrylate | 45.9 | 18.4 | 36.7 | — |
| Anionic surfactant (ALIPAL CO436) | 137.7 | 27.5 | 27.5 | 27.5 |
| DI water | 3441.0 | 688.2 | 688.2 | 688.2 |

TABLE 2.2

| Properties of the aqueous dispersions of Example 2. | | | | |
|---|---|---|---|---|
| Sample | 2 | 3 | 4 | Comparative A |
| Wt. % solids | 46.8 | 47.0 | 47.1 | 46.0 |
| pH | 8.6 | 8.8 | 8.7 | 8.5 |
| Viscosity (cps.) | 325 | 450 | 495 | 215 |
| Particle size(nm.) | 124 | 118 | 113 | 125 |
| THF gel content(%) | 85 | 92 | 92 | 3 |

EXAMPLE 3. Preparation. of all-acrylic aqueous dispersions

Preparation of Samples 5–8 and Comparative Sample B. To a one gallon stirred reactor containing 1113 grams(g.) of deionized water (DI water), 4.1 g. of anionic surfactant (58% active), and 28.3 g. of itaconic acid which had been heated to 85.0 C. was added 130 g. of a preform emulsion and a solution of 4.7 g. ammonium persulfate in 30 g. DI water. The temperature dropped to 80.5 C. and then an exotherm to 85.0 C. was observed, along with a blue color and heavy refluxing. Fifteen minutes after the addition of the preform the temperature was at 81 C. and the addition of the monomer emulsion (ME#1) and a solution of 2.8 g. ammonium persulfate in 106.2 g. DI water were begun. The addition of ME#1 was completed in 171 minutes and a rinse of 40 g. DI water was added. The addition of the ammonium persulfate solution was completed five minutes later: the temperature was 81 C. Fifteen minutes later, with the temperature at 81 C., 40 g. of DI water was added and cooling was initiated. Six minutes later, with the temperature at 54.5 C., three solutions were added: 0.95 g. t-butyl hydroperoxide in 10 g. DI water; 0.5 g. sodium sulfoxylate formaldehyde in 15 g. DI water; and 5 g. of a 0.15% aqueous solution of ferrous sulfate heptahydrate. Fifteen minutes later with the temperature at 50.5 C., solutions identical to the first two of the three abovementioned solutions were added. Twenty-five minutes later the temperature was 44.5 C. and 70.7 g. DI water, 37.7 9. dimethylaminoethanol, and 15.7 g. anionic surfactant were added.

TABLE 3.1

Monomer Emulsions (ME #1) used in Example 3.

| Sample | 5 | 6 | 7 | 8 | Comparative B |
|---|---|---|---|---|---|
| Butyl Acrylate | 802 | 802 | 802 | 802 | 802 |
| Methyl methacrylate | 962 | 962 | 962 | 962 | 962 |
| Hydroxyethyl methacrylate | 94.3 | 94.3 | 94.3 | 94.3 | 94.3 |
| Allyl methacrylate | 4.7 | 9.4 | 18.9 | 37.7 | — |
| Anionic surfactant (ALIPAL CO436) | 28.5 | 28.5 | 28.5 | 28.5 | 28.5 |
| DI water | 704 | 704 | 704 | 704 | 704 |

TABLE 3.2

Properties of aqueous dispersions of Example 3.

| Sample | 5 | 6 | 7 | 8 | Comparative B |
|---|---|---|---|---|---|
| Wt. % solids | 45.4 | 45.5 | 45.9 | 45.7 | 46.0 |
| pH | 8.75 | 8.8 | 8.8 | 8.75 | 8.6 |
| Viscosity(cps.) | 210 | 150 | 115 | 160 | — |
| Particle size(nm.) | 165 | 130 | 110 | 135 | 127 |
| THF gel content(%) | 89 | 91 | 94 | 94 | 4 |

EXAMPLE 4. Preparation of high hydroxyl content aqueous dispersions

Preparation of Samples 9–10 and Comparative Sample C. To a one gallon stirred reactor containing 1300 grams(g.) of deionized water (DI water), 4.0 g. of antioxidant (MAROXOL 20) and 30 g. of itaconic acid which had been heated to 85 C. was added 150 g. of a preform emulsion (45.5% solids) and a solution of 5 g. ammonium persulfate in 50 g. DI water. The temperature dropped to 81 C. and then an exotherm to 83 C. was observed, along with heavy refluxing. Five minutes after the addition of the preform the temperature was at 83 C. and the addition of the monomer emulsion (ME#1) and a solution of 3 g. ammonium persulfate in 150 g. DI water were begun. The addition of ME#1 and the ammonium persulfate solution were completed in 180 minutes and a rinse of 50 g. DI water was added. Thirty minutes later the temperature was at 79 C., 50 g. DI water was added, and cooling was initiated. Thirty-five minutes later with the temperature at 55 C., three solutions were added: 1.0 g. t-butyl hydroperoxide in 5.0 g. DI water; 0.6 g. sodium sulfoxylate formaldehyde in 15.0 g. DI water; and 7 g. of a 0.15% aqueous solution of ferrous sulfate heptahydrate. Ten minutes later with the temperature at 53 C., solutions identical to the first two of the three abovementioned solutions were added. Twenty-six minutes later, with the temperature at 45 C., 50 g. DI water, 30 g. dimethylaminoethanol, and 15 g. of anionic surfactant were added.

TABLE 4.1

Monomer Emulsions(ME #1) for Example 4

| Sample | 9 | 10 | Comparative C |
|---|---|---|---|
| Butyl acrylate | 850 | 850 | 850 |
| Methyl methacrylate | 210 | 180 | 220 |
| Styrene | 500 | 500 | 500 |
| Hydroxyethyl methacrylate | 400 | 400 | 400 |
| Allyl methacrylate | 10 | 40 | — |
| Anionic Surfactant (TRITON XN-45S; 60% active) | 33 | 33 | 33 |
| DI water | 1300 | 1300 | 1300 |

TABLE 4.2

Properties of aqueous dispersions of Example 4

| Sample | 9 | 10 | Comparative C |
|---|---|---|---|
| Wt. % solids | 46.1 | 46.1 | 46.1 |
| pH | 7.4 | 7.5 | 7.5 |
| Viscosity(cps.) | 403 | 259 | 647 |
| Particle size(nm.) | 256 | 282 | 284 |
| THF gel content(%) | 90 | 95 | 32 |

EXAMPLE 5. Preparation of intermediate hydroxyl level aqueous dispersions

Preparation of Samples 11–14. To a one gallon stirred reactor containing 700 grams(g.) of deionized water (DI water), 4.0 g. of antioxidant (MAROXOL 20; 0.5%), and 30 g. of itaconic acid which had been heated to 85 C. was added 150 g. of a preform emulsion and a solution of 5 g. ammonium persulfate in 50 g. DI water. The temperature dropped to 75 C.. The reaction mixture was heated to 82 C. Four minutes after the addition of the preform the temperature was at 82 C. and the addition of the monomer emulsion (ME#1) and a solution of 3 g. ammonium persulfate in 150 g. DI water were begun. The addition of ME#1 and the ammonium persulfate solution was completed in 180 minutes and a rinse of 50 g. DI water was added. Thirty minutes later cooling was initiated. Then, 50 g. of DI water was added and cooling was continued. Twenty minutes later, with the temperature at 55 C., three solutions were added: 1.0 g. t-butyl hydroperoxide (70% active) in 10 g. DI water; 0.6 g. sodium sulfoxylate formaldehyde in 15 g. DI water; and 7 g. of a 0.15% aqueous solution of ferrous sulfate heptahydrate. Ten minutes later with the temperature at 55 C., solutions identical to the first two of the three abovementioned solutions were added. Twenty minutes later, with the temperature at 45 C., 50 g. DI water, 30 g. dimethylaminoethanol, and 15 g. of anionic surfactant (30% active) were added.

TABLE 5.1

Monomer Emulsions(ME #1) for Example 5

| Sample | 11 | 12 | 13 | 14 |
|---|---|---|---|---|
| Butyl acrylate | 850 | 850 | 850 | 850 |
| Methyl methacrylate | 510 | 480 | 410 | 380 |
| Styrene | 500 | 500 | 500 | 500 |
| Hydroxyethyl methacrylate | 100 | 100 | 200 | 200 |
| Allyl methacrylate | 10 | 40 | 10 | 40 |
| Anionic Surfactant (TRITON XN-45S; 60% active) | 33 | 33 | 33 | 33 |
| DI water | 600 | 600 | 600 | 600 |

TABLE 5.2

Properties of aqueous dispersions of Example 5

| Sample | 11 | 12 | 13 | 14 |
|---|---|---|---|---|
| Wt. % solids | 53.5 | 53.5 | 53.5 | 53.5 |
| pH | 7.7 | 7.6 | 7.8 | 7.4 |
| Viscosity(cps.) | 165 | 202 | 1432 | 740 |
| Particle size(nm.) | 293 | 306 | 271 | 283 |
| THF gel content(%) | 87 | 93 | 88 | 91 |

EXAMPLE 6. Evaluation of press release

To 100 g. of aqueous dispersion solids was added 10 g. of aminoplast resin(CYMEL 303; 100% active) and 10 g. of Calcium Stearate(50% solids active) with stirring. The mixture ("prepress sealer") was diluted to 20% total solids with DI water. The prepress sealer was sprayed uniformly at an add-on of 10 grams per square foot onto a dry process fiber mat containing resin binder, wax, and moisture. The fiber mat was placed in a press with a 450 F. platten temperature and subjected to 380 p.s.i. pressure for 1 minute. The resultant board product had a density of about 1.05 and was about ⅛ inches thick. The press releasing performance was rated immediately after the completion of the press cycle, i.e., when the press pressure reached zero, using the following scale:

| Rating | Observation |
|---|---|
| 10 | Board releases and falls immediately |
| 9 | Board sticks and then falls |
| 8 | Board sticks but is easily loosened |
| 7 | Board sticks but requires moderate force to loosen |
| 6 | Board sticks and must be pried off |
| 3 | Very firmly stuck |
| 1 | Very stuck and requires chemical soak or sand-blasting to clean the plates |

TABLE 6.1

Evaluation of aqueous dispersions of Examples 1 and 2

| Sample | 1 | 2 | 3 | 4 | Comparative A |
|---|---|---|---|---|---|
| Press Release Rating | 9 | 9.5 | 10 | 10 | 7.5 |

The samples of this invention demonstrate superior press release.

TABLE 6.2

Evaluation of the aqueous dispersions of Example 3

| Sample | 5 | 6 | 7 | 8 | Comparative B |
|---|---|---|---|---|---|
| Press Release Rating | 8.5 | 9.5 | 10 | 10 | 7 |

The all-acrylic samples of this invention demonstrate superior press release.

TABLE 6.3

Evaluation of the aqueous dispersions of Examples 4 and 5

| Sample | 9 | 10 | 11 | 12 | 13 | 14 | Comparative C |
|---|---|---|---|---|---|---|---|
| Press Release Rating | 10 | 10 | 10 | 10 | 10 | 10 | 8 |

The high hydroxyl functionality, which may lead to a higher level of crosslinking with the aminoplast resin (Comparative C), does not achieve the superior press release of the samples of this invention.

EXAMPLE 7. Evaluation of water uptake of wood composition boards

The water uptake of wood composition boards was measured by the Cobb test. A Cobb unit is defined as the amount of distilled water weight increase in grams per 100 square inches of surface area per 24 hour period.

Boards for measurement were cut into 5 inch by 5 inch squares. An Aluminum ring of 4 inch inside diameter, wall thickness of ⅜ inch and height of one inch was affixed to the test boards with beads of butyl caulk(which had been determined not to contribute to weight change). The boards with rings and control boards without rings were equilibrated for seven days at 65–75 C. and 50–60 % R.H. The boards with rings and the control boards were weighed. The ring was filled with approximately 1/2 inch of distilled water. After 24 hours the water was poured out, the ring surface was blotted dry with a soft paper towel, and the board with ring was weighed. The control board was then weighed; if the weight of the control board had changed by more than 0.20 g., the entire test was abandoned. The weight change for the board with ring was multiplied by 7.96 to yield the Cobb unit value.

TABLE 7.1

Evaluation of Cobb water pick up
Samples 9–14 and Comparative C were formulated into prepress sealers according to the method of Example 6 and evaluated for Cobb water pick-up.

| Sample | 9 | 10 | 11 | 12 | 13 | 14 | Comp.C | Water |
|---|---|---|---|---|---|---|---|---|
| Cobb Units | 21.79 | 22.65 | 17.71 | 23.25 | 15.20 | 22.65 | 17.40 | 34.04 |

All of the prepress sealers have substantially lower water pickup than when water is used as the prepress sealer, that is, all function to render the formed board more water resistant.

EXAMPLE 8. Evaluation of surface integrity

The surface integrity of wood composition boards to which a prepress sealer had been applied was evaluated by a tape adhesion test. A board sample approximately 4 inches by 6 inches was selected. A strip of tape (3M tape #610 was used) was placed on the surface of the board and pressed on the surface by rubbing it with the tape roll. One end of the tape was pulled off with a quick steady motion with the pulled end of the tape at a 90 degree angle to the tape adhering to the board. The % of fiber pull was evaluated visually.

TABLE 8.1

Evaluation of the surface integrity of boards treated with prepress sealer

| Sample | 9 | 10 | Comp.C | 11 | 12 | 13 | 14 |
|---|---|---|---|---|---|---|---|
| % Fiber Pull | 0 | 0 | 20 | 0 | 5 | 0 | 2 |

The samples of this invention display a higher surface integrity than the comparative sample as evidenced by lower levels of fiber pull in the surface integrity test.

EXAMPLE 9. Prepress sealers based on aqueous copolymer dispersions incorporating different acids.

Preparation of Samples 15 and 16. To a one gallon stirred reactor was containing 1063 grams(g.) of deionized water (DI water) and 4.0 g. of anionic surfactant (60% active) which had been heated to 85 C. was added 82 g. of a preform emulsion, 8 g. DI water, and a solution of 4 g. ammonium persulfate in 40 g. DI water. The temperature dropped to 81.5 C. and then an exotherm to 86.5 C. was observed. Twenty-four minutes after the addition of the preform the temperature was at 82.5 C. and the addition of the monomer emulsion (ME#1) and a solution of 2.4 g. ammonium persulfate in 120 g. DI water were begun. The addition of ME#1 and the persulfate solution were were complete in 180 minutes and 10 g. DI water was added. Thirty minutes later with the temperature at 84 C., cooling was initiated. Nine minutes later, with the temperature at 74.2 C., 37.2 g. of DI water was added and cooling was continued. Thirty-nine minutes later, with the temperature at 54.5 C., three solutions were added: 0.8 g. t-butyl hydroperoxide in 4 g. DI water; 0.48 g. sodium sulfoxylate formaldehyde in 12 g. DI water; and 5.6 g. of a 0.15% aqueous solution of ferrous sulfate heptahydrate. Seventeen minutes later with the temperature at 51.5 C., solutions identical to the first two of the three abovementioned solutions were added. Twenty minutes later, with the temperature at 44 C., 40 g. DI water, 28 g. dimethylaminoethanol, and 12 g. of anionic surfactant (30% active) were added.

TABLE 9.1

Monomer Emulsions(ME #1) for Example 9

| Sample | 15 | 16 |
|---|---|---|
| Butyl acrylate | 680 | 680 |
| Methyl methacrylate | 384 | 384 |
| Styrene | 400 | 400 |
| Hydroxyethyl methacrylate | 80 | 80 |
| Allyl methacrylate | 32 | 32 |
| Methacrylic acid | 24 | — |
| Acrylic acid | — | 24 |
| Anionic Surfactant (TRITON XN-45S; 60% active) | 22.7 | 22.7 |
| DI water | 420 | 420 |

TABLE 9.2

Properties of aqueous dispersions of Example 9

| Sample | 15 | 16 |
|---|---|---|
| Wt. % solids | 45.8 | 45.9 |
| pH | 9.3 | 9.0 |
| Viscosity(cps.) | 413 | 388 |
| Particle size(nm.) | 111 | 115 |
| THF gel content(%) | 90 | 92 |

TABLE 9.3

Properties of prepress sealers of Example 9 Samples 15, 16, and 4 were formulated into prepress sealers and evaluated for press release as described in Example 6.

| Sample | 15 | 16 | 4 |
|---|---|---|---|
| Copolymerized acid | Methacrylic | Acrylic | Itaconic |
| THF gel content | 90 | 92 | 92 |

TABLE 9.3-continued

Properties of prepress sealers of Example 9 Samples 15, 16, and 4 were formulated into prepress sealers and evaluated for press release as described in Example 6.

| Sample | 15 | 16 | 4 |
|---|---|---|---|
| Press release | 10 | 10 | 10 |

The nature of the copolymerized acid in the samples of this invention does not affect their adhesion to the press plates sufficiently to reduce their excellent press release.

EXAMPLE 10. Prepress sealers based on other crosslinking agents

Preparation of Samples 17 and 18. To a one gallon stirred reactor containing 1000 grams(g.) of deionized water (DI water) and 0.6 g. of anionic surfactant (60% active) been heated to 84.5 C. was added 100 g. of a preform emulsion and a solution of 4.25 g.of ammonium persulfate in 25 g. DI water. The temperature dropped to 78 C. and then an exotherm to 84 C. was observed. Seventeen minutes after the addition of the preform the temperature was at 83 C. and the addition of the monomer emulsion (ME#1) and a solution of 2.7 g. ammonium persulfate in 100 g. DI water were begun. The addition of ME#1 and the persulfate solution was completed in 180 minutes and 100 g. DI water was added. Thirty minutes later with the temperature at 84 C., cooling was initiated. Ten minutes later, with the temperature at 60 C., 100 g. of DI water was added and cooling was continued. Twelve minutes later, with the temperature at 50 C., three solutions were added: 1.0 g. t-butyl hydroperoxide in 10 g. DI water; 0.5 g. isoascorbic acid in 15 g. DI water; and 5 g. of a 0.15% aqueous solution of ferrous sulfate heptahydrate. Twenty minutes later with the temperature at 42 C., solutions identical to the first two of the three abovementioned solutions were added. Twenty minutes later, with the temperature at 44 C., 25 g. of aqueous ammonia in 100 g. DI water was added.

TABLE 10.1

Monomer Emulsions(ME #1) for Example 10

| Sample | 17 | 18 |
|---|---|---|
| Butyl acrylate | 786.6 | 786.6 |
| Methyl methacrylate | 498.6 | 462.6 |
| Styrene | 450 | 450 |
| Allyl methacrylate | — | 36 |
| Acrylic acid | 64.8 | 64.8 |
| Anionic Surfactant (TRITON XN-45S; 60% active) | 29.4 | 29.4 |
| DI water | 650 | 650 |

TABLE 10.2

Properties of aqueous dispersions of Example 10

| Sample | 17 | 18 |
|---|---|---|
| Wt. % solids | 45.1 | 45.2 |
| pH | 7.4 | 7.8 |
| Viscosity(cps.) | 306 | 200 |
| Particle size(nm.) | 159 | 165 |
| HF gel content(%) | 17 | 95 |

TABLE 10.3

Press release using a hydroxyalkylamide crosslinking resin
Samples 17 and 18 were formulated into prepress sealers and
evaluated for press release as described in Example 6,
with the exception that bis(N,N-di(b-hydroxyethyl))adipamide
("HEA") was substituted for the CYMEL 303 as the crosslinking
resin. The preparation of the adipamide is described in U.S.
Pat. 4,076,917, which is hereby incorporated herein by reference.

| Sample | 17 | 17 | 18 | 18 |
|---|---|---|---|---|
| Crosslinker | None | HEA | None | HEA |
| Press release | 1 | 2 | 7 | 10 |

Sample 17 which has a gel content outside the scope of this invention exhibits very poor press release with or without crosslinking resin. Sample 18 of this invention exhibits poor press release without crosslinking resin, but excellent press release when formulated into a prepress sealer with a crosslinking resin.

What is claimed is:

1. An improved process for manufacturing wood composition boards under heat and pressure comprising providing a fibrous mat, treating the surface of said mat, hot pressing said mat at elevated temperature and pressure into a solid composition board product, and releasing said composition board from said press wherein the improvement comprises treating the surface of the mat with a composition comprising a crosslinking resin and an aqueous dispersion of acrylic polymer particles, wherein said particles have a THF gel content of greater than about 70% and wherein said particles are formed from a monomer mixture comprising from about 0.2% to about 5%. by weight allyl methacrylate based on the weight of said particles; and whereby the press release rating of said manufactured wood composition board is superior to that of a comparative board comprising particles having a THF gel content of less than about 70%.

2. The process of claim 1 wherein said crosslinking resin is selected from the group consisting of aminoplast resins, multi- functional hydroxyalkyl amides, and multi-functional N-alkylol amides.

* * * * *